(12) United States Patent
Katoh

(10) Patent No.: US 8,610,620 B2
(45) Date of Patent: Dec. 17, 2013

(54) OBJECT DETECTING APPARATUS AND OBJECT DETECTING METHOD

(75) Inventor: Masayuki Katoh, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/057,217

(22) PCT Filed: Dec. 8, 2009

(86) PCT No.: PCT/JP2009/070562
§ 371 (c)(1),
(2), (4) Date: Feb. 2, 2011

(87) PCT Pub. No.: WO2011/070650
PCT Pub. Date: Jun. 16, 2011

(65) Prior Publication Data
US 2012/0313806 A1    Dec. 13, 2012

(51) Int. Cl.
*G01S 13/86* (2006.01)
*G01S 13/93* (2006.01)

(52) U.S. Cl.
USPC ............................................. 342/52; 342/70

(58) Field of Classification Search
USPC .......................................................... 342/52
See application file for complete search history.

(56) References Cited

U.S. PATENT DOCUMENTS

| | | | | |
|---|---|---|---|---|
| 5,018,218 A | * | 5/1991 | Peregrim et al. | 382/103 |
| 5,027,422 A | * | 6/1991 | Peregrim et al. | 382/294 |
| 5,052,045 A | * | 9/1991 | Peregrim et al. | 382/199 |
| 5,168,529 A | * | 12/1992 | Peregrim et al. | 382/199 |
| 5,168,530 A | * | 12/1992 | Peregrim et al. | 382/199 |
| 5,173,949 A | * | 12/1992 | Peregrim et al. | 382/294 |
| 6,788,817 B1 | * | 9/2004 | Saka et al. | 382/199 |
| 6,792,147 B1 | * | 9/2004 | Saka et al. | 382/199 |
| 2009/0214079 A1 | * | 8/2009 | Hamza et al. | 382/103 |
| 2011/0301845 A1 | * | 12/2011 | Harada | 701/301 |

FOREIGN PATENT DOCUMENTS

| | | |
|---|---|---|
| JP | A-08-122432 | 5/1996 |
| JP | A-2007-288460 | 11/2007 |
| JP | A-2008-276689 | 11/2008 |
| JP | 2009098025 A * | 5/2009 |
| JP | A-2009-186260 | 8/2009 |

OTHER PUBLICATIONS

International Search Report in International Application No. PCT/JP2009/070562; dated Mar. 23, 2010 (with English-language translation).

* cited by examiner

Primary Examiner — Matthew M Barker
(74) *Attorney, Agent, or Firm* — Oliff & Berridge, PLC

(57) ABSTRACT

An object of the present invention is to further improve the detection accuracy of a lateral position of a target in an object detecting apparatus for detecting an object by using a radar and a monocular image sensor. In the present invention, a target corresponding to a target recognized by the radar is extracted and a right edge and a left edge of the target are acquired from an image picked up by the monocular image sensor. Further, locus approximation lines, which are straight lines or predetermined curved lines for approximating loci of the right edge and the left edge, are derived for the both edges. The edge, which has a larger number of edges existing on the locus approximation line, is selected as a true edge of the target from the right edge and the left edge. The lateral position of the target is derived on the basis of the position of the selected edge.

8 Claims, 14 Drawing Sheets

(a)

(b)

✳ :MILLIMETER WAVE DETECTION POSITION
⊢ :MONOCULAR IMAGE DETECTION EDGE

OBJECT DETECTING APPARATUS AND OBJECT DETECTING METHOD

TECHNICAL FIELD

The present invention relates to an object detecting apparatus and an object detecting method in which an object is detected on the basis of information acquired by a radar and an image sensor.

BACKGROUND ART

In recent years, safety systems such as PCS (Pre-crash safety system) and the like are developed in order to avoid the collision or reduce the damage caused by the collision. In order to preferably realize such a safety system, it is necessary to correctly grasp, for example, the position and the size of an obstacle including, for example, a pedestrian and a vehicle other than a subject vehicle as well as the distance between the obstacle and the subject vehicle. An object detecting apparatus, which is based on the use of a radar and a stereo image sensor, is known as a technique for grasping, for example, the position, the size, and the distance as described above.

When the radar is used, it is possible to recognize a target (object provided as a detection objective) as a point of reflection of the electromagnetic wave. Accordingly, it is possible to acquire or obtain the position of the target. However, it is difficult to correctly acquire the edge of the target by means of the radar. On the other hand, it is possible to highly accurately acquire the edge of the target from an image picked up or photographed by the stereo image sensor. Thus, the object detecting apparatus as described above causes the fusion of the target information acquired by the radar and the target information acquired from the image picked up by the stereo image sensor. Accordingly, it is possible to improve the object detecting ability of the object detecting apparatus.

However, when the stereo image sensor is used as the image sensor, it is necessary to secure a relatively large space in order to install the stereo image sensor. Further, the cost is relatively expensive as well in order to realize the object detecting apparatus. Therefore, it is demanded that an object detecting apparatus, which has the function and the performance equivalent to those obtained when the stereo image sensor is used, is realized by using a monocular image sensor in place of the stereo image sensor.

Patent Document 1 discloses a vehicle obstacle recognizing apparatus which uses a millimeter wave radar and a monocular camera. The vehicle obstacle recognizing apparatus comprises an object information calculating means, an image processing means, and a vehicle information acquiring means. The object information calculating means calculates the object information including, for example, the relative lateral position and the relative distance with respect to the detection object from the output of the millimeter wave radar. The image processing means processes an image picked up or photographed by the monocular camera on the basis of the calculation result obtained by the object information calculating means. The vehicle obstacle recognizing apparatus judges the possibility of the detection object to behave as an obstacle on the basis of the outputs of at least the object information calculating means and the vehicle information acquiring means. Further, it is judged whether or not the output of the image processing means is effective to judge the obstacle, on the basis of the calculation result obtained by the object information calculating means. Only when the output of the image processing means is effective, the output of the image processing means is also used to judge the obstacle.

Patent Document 2 discloses an object detecting apparatus for acquiring image information and distance information from a camera and a radar. In the object detecting apparatus, the direction vector of the edge, the direction vector variance of the edge, the edge intensity, and the edge intensity variance are calculated from the image information. The type of an objective is judged on the basis of at least one of them and the distance with respect to the detection objective.

PRIOR ART DOCUMENTS

Patent Documents

Patent Document 1: Japanese Patent Application Laid-Open No. 2008-276689
Patent Document 2: Japanese Patent Application Laid-Open No. 2007-288460

DISCLOSURE OF THE INVENTION

Problem to be Solved by the Invention

When the monocular image sensor is used as the image sensor in the object detecting apparatus, it is possible to contemplate the space saving and the low cost. However, it is difficult to acquire any correct information in the distal direction or depth direction from the image picked up by the monocular image sensor. Therefore, when the left and right edges of a target are detected from an image picked up by the monocular image sensor, an edge of an object or a pattern, which actually exists distally as compared with the target as viewed from the subject vehicle, is erroneously detected as the edge of the target in some cases. If the position in the lateral direction of the target (lateral position) is derived on the basis of the edge erroneously detected as described above, it is feared that the lateral position of the target may be erroneously detected as well.

The present invention has been made taking the foregoing problem into consideration, an object of which is to provide a technique which makes it possible to further improve the detection accuracy of the lateral position of a target in an object detecting apparatus for detecting an object on the basis of target information acquired by a radar and target information acquired from an image picked up by a monocular image sensor.

Means for Solving the Problem

In the present invention, a right edge and a left edge of a target are acquired or obtained from an image picked up or photographed by a monocular image sensor. Further, locus approximation lines, which are straight lines or predetermined curved lines for approximating loci of the right edge and the left edge, are derived for the both edges. The edge, which is included in the right edge and the left edge and which has a larger number of edges existing on the locus approximation line, is selected as the true edge of the target. The lateral position of the target is derived on the basis of the position of the selected edge.

More specifically, the object detecting apparatus according to a first invention resides in an object detecting apparatus for detecting an object on the basis of target information acquired by a radar and target information acquired from an image picked up by a monocular image sensor, the object detecting apparatus comprising:

an edge acquiring means which extracts a target corresponding to a target recognized by the radar, from the image picked up by the monocular image sensor and which acquires a right edge and a left edge of the extracted target;

a locus approximation line deriving means which derives, for the both edges, locus approximation lines as straight lines or predetermined curved lines for approximating loci of the right edge and the left edge acquired by the edge acquiring means;

a selecting means which selects, as a true edge of the target, the edge having a larger number of edges existing on the locus approximation line, from the right edge and the left edge acquired by the edge acquiring means; and a lateral position deriving means which derives a lateral position of the target on the basis of a position of the edge selected as the true edge by the selecting means.

According to the present invention, the edge which has the higher reliability and which is selected from the right edge and the left edge of the target acquired from the image picked up by the monocular image sensor, is selected as the true edge of the target. The lateral position of the target is derived on the basis of the position of the edge having the higher reliability. Therefore, it is possible to further improve the detection accuracy of the lateral position of the target.

The object detecting apparatus according to the present invention may further comprise a weight applying means which applies reliability weights to the right edge and the left edge acquired by the edge acquiring means. In this case, the weight applying means applies the weights to the right edge and the left edge so that the edge, which is disposed nearer to a position of the target recognized by the radar, has a higher reliability. Further, the object detecting apparatus according to the present invention may comprise a reliability total value calculating means which totalizes a plurality of reliabilities having the weights applied by the weight applying means for each of the right edge and the left edge to thereby calculate total values of the reliabilities for the both edges.

In the present invention, the number of the edges existing on the locus approximation line is identical between the right edge and the left edge in some cases. In such a situation, the selecting means may select, as the true edge of the target, the edge which has the larger total value of the reliabilities calculated by the reliability total value calculating means, from the right edge and the left edge.

Accordingly, the edge, which has the higher reliability and which is selected from the right edge and the left edge of the target, can be also selected as the true edge of the target.

In the present invention, the lateral position deriving means may include a locus predicting means and a collision position predicting means. The locus predicting means predicts a future locus of the edge selected as the true edge by the selecting means. The collision position predicting means predicts a collision position between the target and a vehicle as a position at which a distance between the edge and the vehicle in the front-back direction is zero on the basis of the future locus of the edge predicted by the locus predicting means. In this case, a lateral position of a center in a lateral direction of the target (hereinafter referred to as "target center"), which is to be provided at the collision position, may be derived by the lateral position deriving means on the basis of a position of the edge selected as the true edge by the selecting means at the collision position predicted by the collision position predicting means.

Accordingly, it is possible to detect the lateral position of the target center at the collision position between the target and the vehicle.

In the object detecting apparatus according to the present invention, the lateral position deriving means may include a lateral width estimating means which estimates a lateral width of the target. In this case, a position, which is deviated toward the other edge by ½ of the lateral width of the target estimated by the lateral width estimating means from the position of the edge selected as the true edge by the selecting means, may be derived by the lateral position deriving means as a lateral position of the target center.

Accordingly, it is possible to detect the lateral position of the target center highly accurately.

The object detecting method according to a second invention resides in an object detecting method for detecting an object on the basis of target information acquired by a radar and target information acquired from an image picked up by a monocular image sensor, the object detecting method comprising:

an edge acquiring step of extracting a target corresponding to a target recognized by the radar, from the image picked up by the monocular image sensor and acquiring a right edge and a left edge of the extracted target;

a locus approximation line deriving step of deriving, for the both edges, locus approximation lines as straight lines or predetermined curved lines for approximating loci of the right edge and the left edge acquired in the edge acquiring step;

a selecting step of selecting, as a true edge of the target, the edge having a larger number of edges existing on the locus approximation line, from the right edge and the left edge acquired in the edge acquiring step; and a lateral position deriving step of deriving a lateral position of the target on the basis of a position of the edge selected as the true edge in the selecting step.

In the present invention, the lateral position of the target is also derived on the basis of the position of the edge having the higher reliability. Therefore, it is possible to further improve the detection accuracy of the lateral position of the target.

The object detecting method according to the present invention may further comprise a weight applying step of applying reliability weights to the right edge and the left edge acquired in the edge acquiring step. In this case, the weights are applied to the right edge and the left edge in the weight applying step so that the edge, which is disposed nearer to a position of the target recognized by the radar, has a higher reliability. Further, the object detecting method according to the present invention may comprise a reliability total value calculating step of totalizing a plurality of reliabilities having the weights applied in the weight applying step for each of the right edge and the left edge to thereby calculate total values of the reliabilities for the both edges.

In the present invention, the edge, which has the larger total value of the reliabilities calculated in the reliability total value calculating step, may be selected as the true edge of the target in the selecting step, if the number of the edges existing on the locus approximation line is identical between the right edge and the left edge.

Accordingly, the edge, which has the higher reliability and which is selected from the right edge and the left edge of the target, can be selected as the true edge of the target.

In the first and second inventions, the "edge existing on the locus approximation line" may include not only the edge existing at the position completely coincident with the locus approximation line but also the edge positioned within a predetermined allowable range from the locus approximation line.

Advantageous Effect of the Invention

According to the present invention, it is possible to further improve the detection accuracy of the lateral position of the target in the object detecting apparatus for detecting the object on the basis of the target information acquired by the radar and the target information acquired from the image picked up by the monocular image sensor.

THE MODE FOR CARRYING OUT THE INVENTION

Specified embodiments of the present invention will be explained below on the basis of the drawings. For example, the size, the material, the shape, and the relative arrangement of any constitutive part described in the embodiment of the present invention are not aimed to limit the technical scope of the invention only thereto unless specifically stated.
<First Embodiment>

A first embodiment of the present invention will be explained on the basis of FIGS. 1 to 9.
(Schematic Arrangement)

Figure 1:
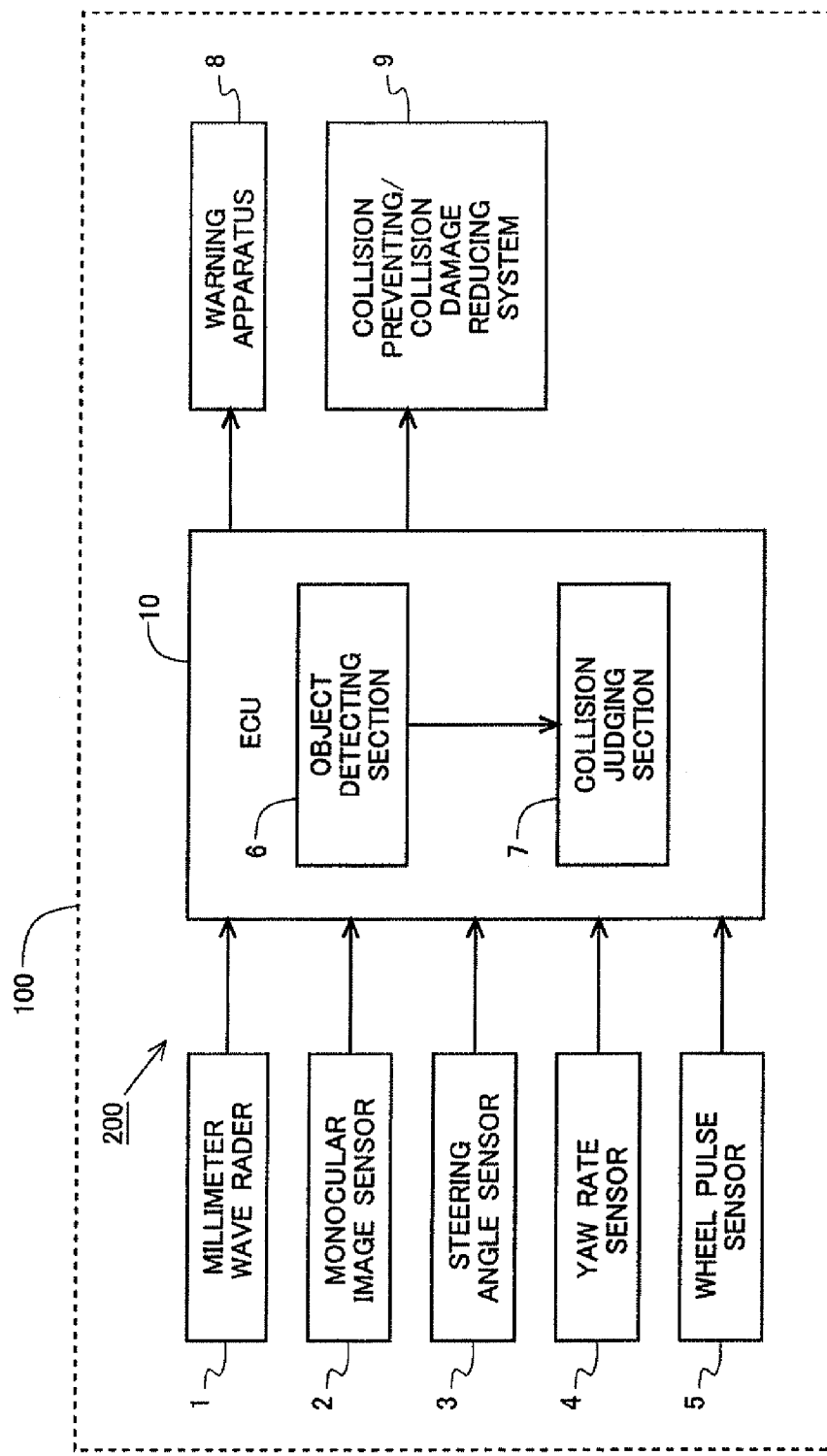
FIG. 1 shows a block diagram illustrating a schematic arrangement of a collision predicting apparatus according to a first embodiment.
Figure 2:
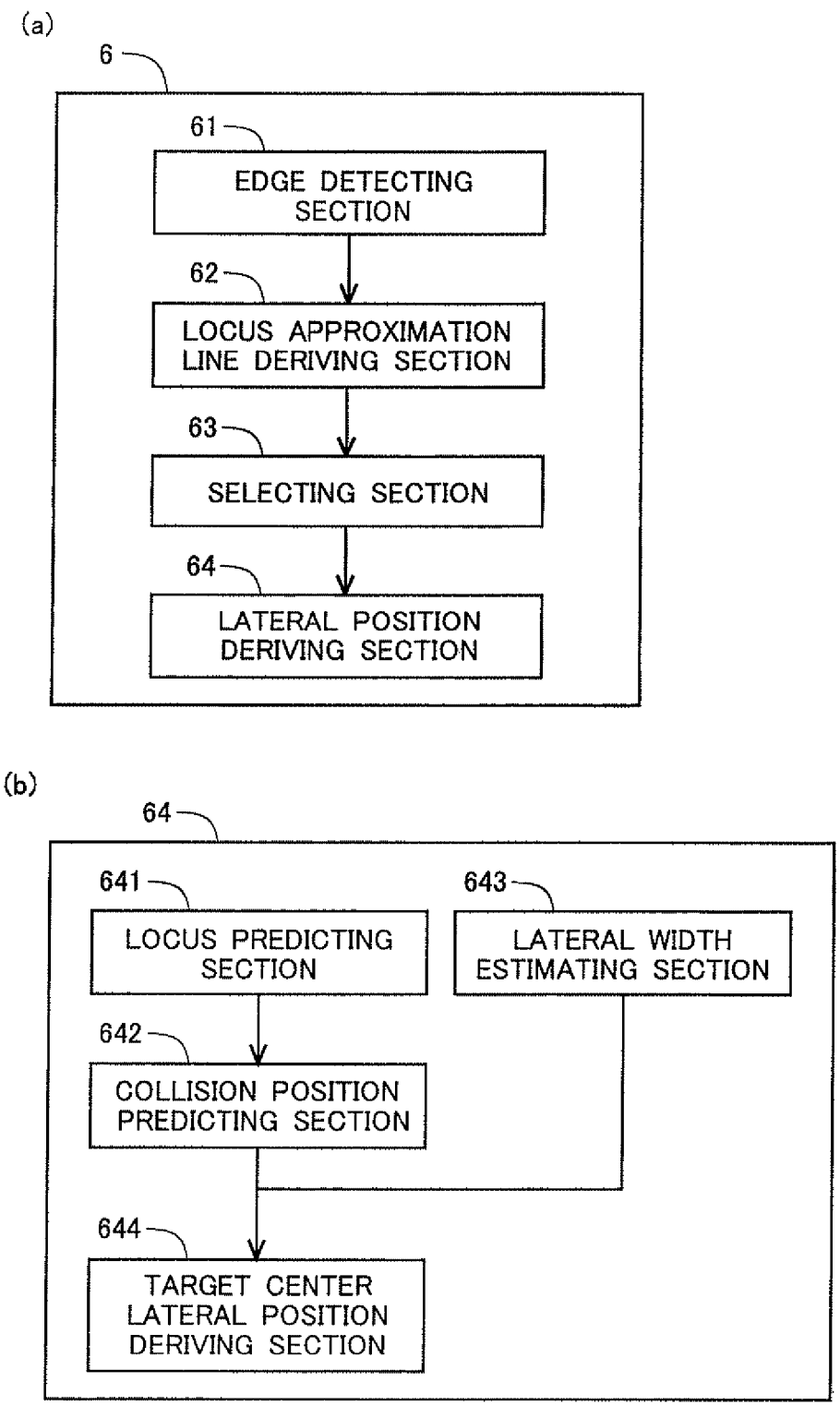
FIG. 2 shows block diagrams illustrating a schematic arrangement of an object detecting section according to the first embodiment.

In this section, an explanation will be made about a case in which the present invention is applied to a collision predicting apparatus. FIGS. 1 and 2 show block diagrams illustrating a schematic arrangement of the collision predicting apparatus according to this embodiment. The collision predicting apparatus 200 is carried on a vehicle 100, which is an apparatus to predict the collision between a subject vehicle 100 and an obstacle including, for example, another vehicle (object vehicle) and a pedestrian or walker. A warning apparatus 8 and a collision preventing/collision damage reducing system 9, which are operated if the collision with the obstacle is predicted, are carried on the vehicle 100 in addition to the collision predicting apparatus 200.

The collision predicting apparatus 200 comprises a millimeter wave radar 1, a monocular image sensor 2, a steering angle sensor 3, a yaw rate sensor 4, a wheel pulse sensor 5, and ECU 10. The millimeter wave radar 1 is attached to a front central portion of the vehicle 100. The millimeter wave radar 1 performs the scanning in the horizontal direction with an electromagnetic wave in a millimeter wave band for those disposed in the frontward direction and the oblique frontward direction of the vehicle 100. Further, the millimeter wave radar 1 receives the electromagnetic wave reflected by a surface of an object disposed outside the vehicle. Accordingly, the millimeter wave radar 1 recognizes a target as a point of reflection of the electromagnetic wave. The target information (for example, the relative position of the target with respect to the subject vehicle 100), which is acquired or obtained from the transmitted/received data of the millimeter wave, is inputted into ECU 10.

The monocular image sensor 2 is attached to a front central portion of the vehicle 100. The monocular image sensor 2 photographs or picks up the image in the frontward direction and the oblique frontward direction of the vehicle 100. The picked up image is inputted as an image signal into ECU 10.

The steering angle sensor 3 is attached, for example, to a steering rod of the vehicle 100. The steering angle sensor 3 detects the steering angle of the steering wheel operated by a driver. The yaw rate sensor 4 is provided at a central position of the body of the vehicle 100. The yaw rate sensor 4 detects the yaw rate applied to the body. The wheel pulse sensor 5 is attached to a wheel portion of the vehicle 100. The wheel pulse sensor 5 detects the wheel velocity of the vehicle. Output signals of the sensors are inputted into ECU 10.

ECU 10 has an object detecting section 6 and a collision judging section 7. The object detecting section detects the obstacle on the basis of the target information acquired by the millimeter wave radar 1 and the target information acquired from the image picked up by the monocular image sensor 2. The collision judging section 7 judges whether or not the obstacle detected by the object detecting section 6 and the subject vehicle 100 collide with each other. Details will be described later on about the object detecting method performed in the object detecting section 6 and the collision judging method performed in the collision judging section 7.

FIG. 2 shows block diagrams illustrating a schematic arrangement of the object detecting section 6 according to this embodiment. As shown in FIG. 2(a), the object detecting section 6 has an edge detecting section 61, a locus approximation line deriving section 62, a selecting section 63, and a lateral position deriving section 64. As shown in FIG. 2(b), the lateral position deriving section 64 has a locus predicting section 641, a collision position predicting section 642, a lateral width estimating section 643, and a target center lateral position deriving section 644. Details of the respective sections 61 to 64 and 641 to 644 will be described later on.

Further, ECU 10 has calculating sections for calculating various parameters required to judge the collision in the collision judging section including, for example, an estimated curve radius calculating section, a subject vehicle velocity calculating section, a subject vehicle orbit calculating section, an obstacle velocity calculating section, and an obstacle movement distance calculating section (not shown). For example, the estimated curve radius calculating section calculates the estimated curve radius of the subject vehicle 100 on the basis of the steering angle signal inputted from the steering angle sensor 3 and the yaw rate signal inputted from the yaw rate sensor 4. The subject vehicle velocity calculating section calculates the vehicle velocity of the subject vehicle 100 on the basis of the wheel velocity signal inputted from the wheel pulse sensor 5. The subject vehicle orbit calculating section calculates the orbit of the subject vehicle 100 on the basis of the estimated curve radius signal inputted from the estimated curve radius calculating section. The obstacle velocity calculating section calculates the movement velocity of the obstacle detected by the object detecting section 6 on the basis of the target information. The obstacle movement distance calculating section calculates the movement distance after the detection of the obstacle detected by the object detecting section 6 on the basis of the target information.

If it is judged by the collision judging section 7 that the subject vehicle will collide with the obstacle, the ON signal is transmitted from ECU 10 to the warning apparatus 8 and the collision preventing/collision damage reducing system 9. When the warning apparatus 8 receives the ON signal, the warning apparatus 8 executes the warning to the driver by means of, for example, the voice and/or the display on a monitor. When the collision preventing/collision damage reducing system receives the ON signal, the collision preventing/collision damage reducing system 8 executes the collision preventing control and/or the collision damage reducing control. The collision preventing/collision damage reducing system may be exemplified, for example, by an automatic steering system, a seat belt control system, a seat position control system, a brake control system, and an airbag control system.

(Method for Deriving Lateral Position)

The object detecting section 6 of ECU 10 of the collision predicting apparatus 200 derives the lateral position of the obstacle in order to use the lateral position for judging the collision in the collision judging section 7. An explanation will be made below on the basis of FIGS. 3 to 7 about a method for deriving the lateral position of the obstacle according to this embodiment.

As described above, the object detecting section detects the obstacle on the basis of the target information acquired by the millimeter wave radar 1 and the target information acquired from the image picked up by the monocular image sensor 2. When the millimeter wave radar 1 is used, it is possible to detect the relative position of the target with respect to the subject vehicle 100. However, it is difficult for the millimeter wave radar 1 to detect the edge of the target highly accurately. In view of the above, in this embodiment, the edge of the target is detected by using the image picked up by the monocular image sensor 2.

In particular, the edge detecting section 61 of the object detecting section 6 is used to extract the target corresponding to the target recognized by the millimeter wave radar 1, i.e., the target existing at the position of the target detected by the millimeter wave radar 1 (hereinafter referred to as "millimeter wave detection position" in some cases) from the image picked up by the monocular image sensor 2. Further, the right edge and the left edge of the target are detected from the image of the extracted target (the edge is hereinafter referred to as "monocular image detection edge" in some cases).

However, it is difficult to acquire any correct information (distance) in the distal direction from the image picked up by the monocular image sensor 2. Therefore, when the left and right edges of the target are detected from the image picked up by the monocular image sensor 2, any edge of an object or a pattern, which actually exists distally from the target as viewed from the subject vehicle 100, is erroneously detected as the edge of the target in some cases.

Figure 3:
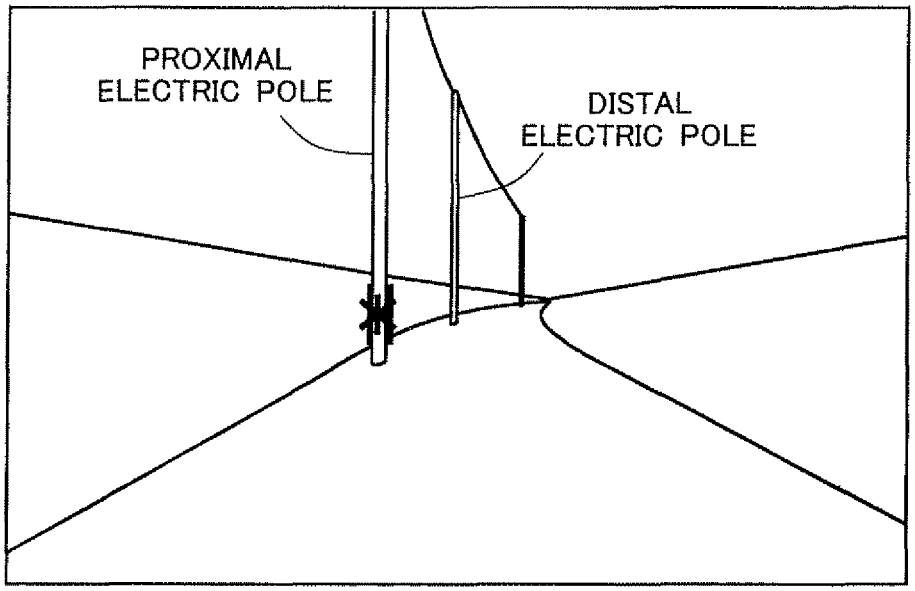
FIG. 3 shows a millimeter wave detection position and monocular image detection edges in relation to an image picked up by a monocular image sensor.
Figure 3:
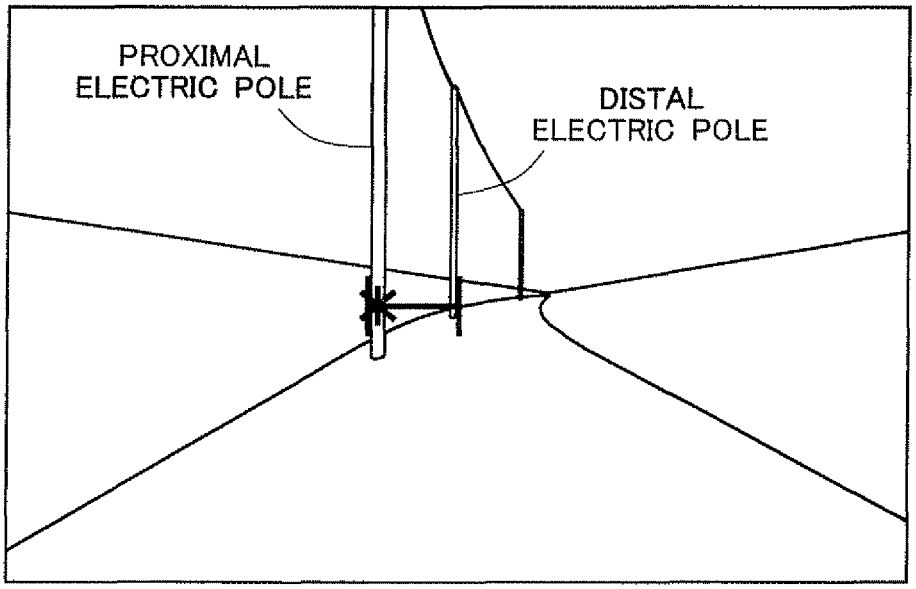

FIG. 3 shows a millimeter wave detection position and monocular image detection edges in relation to an image picked up or photographed by the monocular image sensor. FIG. 3(*a*) shows a case in which the edges of the target are detected normally, and FIG. 3(*b*) shows a case in which the edge of the target is erroneously detected. In FIGS. 3(*a*) and 3(*b*), the target is the "proximal electric pole". As shown in FIG. 3(*b*), when the edges are detected from the image picked up by the monocular image sensor, the edge of the "distal electric pole" is erroneously detected as the edge of the "proximal electric pole" in some cases.

Figure 4:
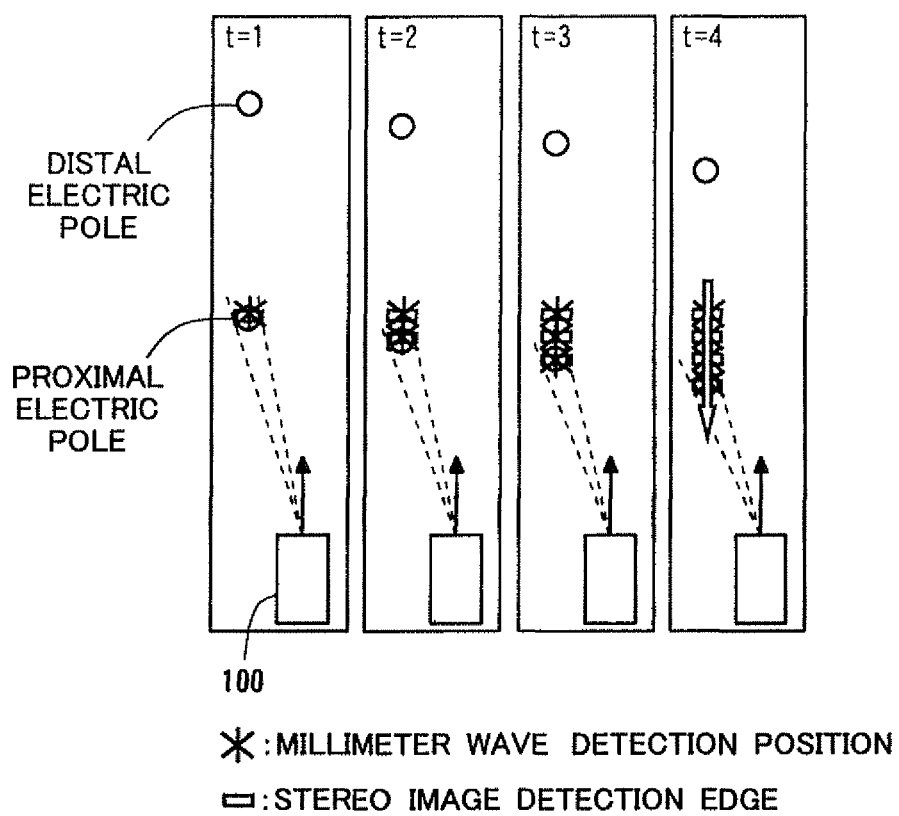
FIG. 4 shows a detection result obtained when an obstacle is detected by using a millimeter wave radar and a stereo image sensor.

An explanation will now be made on the basis of FIG. 4 about a detection result obtained when the obstacle is detected by using the millimeter wave radar and a stereo image sensor unlike the embodiment of the present invention. Also in this case, the target, which exists at the millimeter wave detection position, is extracted from an image picked up or photographed by the stereo image sensor. The right edge and the left edge of the target are detected from the image of the extracted target (the edges are hereinafter referred to as "stereo image detection edges" in some cases). FIG. 4 shows the time-dependent position change of the millimeter wave detection position and the stereo image detection edge with respect to the subject vehicle when the "proximal electric pole" is the target. In FIG. 4, the drawing, in which t=n+1 is given, depicts the situation obtained 50 ms after the situation depicted in the drawing in which t=n is given. In the drawing in which t=4 is given, the blanked arrow indicates the locus of the target derived on the basis of the millimeter wave detection position and the stereo image detection edge.

It is possible to acquire correct information in the distal direction from the image picked up by the stereo image sensor. Therefore, when the edge is detected from the image picked up by the monocular image sensor, even if the "distal electric pole" exists distally as compared with the "proximal electric pole", then the edge of the "distal electric pole" is not erroneously detected as the edge of the "proximal electric pole" as shown in FIG. 4.

Therefore, the lateral position of the target center can be derived highly accurately on the basis of the stereo image detection edge. Therefore, as shown in the drawing in which t=4 is given, the locus of the target can be derived highly accurately on the basis of the millimeter wave detection positions and the stereo image detection edges. As a result, it is also possible to highly accurately predict the future locus of the target.

Figure 5:
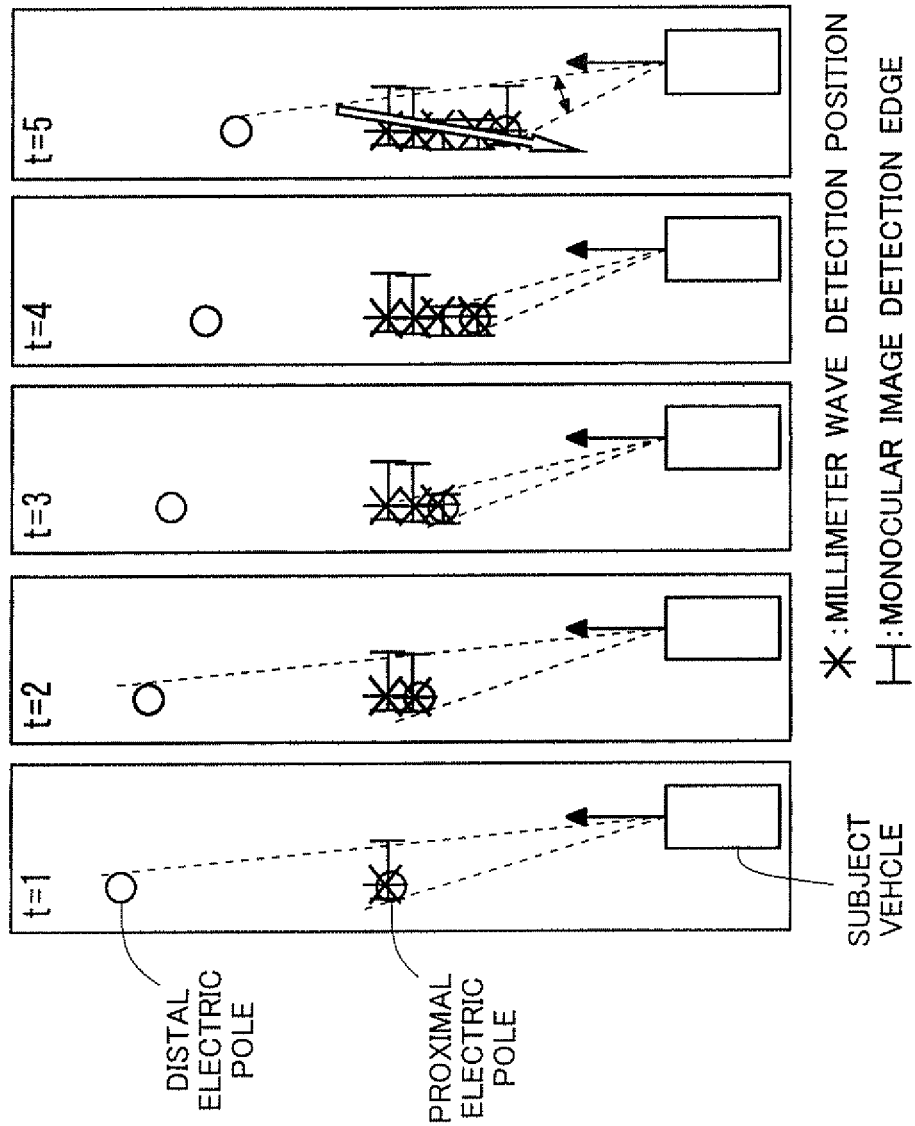
FIG. 5 shows a detection result obtained when an obstacle is detected by using a millimeter wave radar and the monocular image sensor.

On the other hand, an explanation will be made on the basis of FIG. 5 about a detection result obtained when the obstacle is detected by using the millimeter wave radar and the monocular image sensor as performed in this embodiment. FIG. 5 shows the time-dependent position change of the millimeter wave detection position and the monocular image detection edge with respect to the subject vehicle when the "proximal electric pole" is the target. In FIG. 5, the drawing, in which t=n+1 is given, depicts the situation obtained 50 ms after the situation depicted in the drawing in which t=n is given, in the same manner as in FIG. 4. In the drawing in which t=5 is given, the blanked arrow indicates the locus of the target derived on the basis of the millimeter wave detection position and the monocular image detection edge.

As described above, when the edge is detected from the image picked up by the monocular image sensor, the edge of the "distal electric pole" is erroneously detected as the edge of the "proximal electric pole" in some cases. Therefore, it is difficult to highly accurately derive the lateral position of the target center on the basis of the monocular image detection edge. Therefore, when the locus of the target is derived on the basis of the millimeter wave detection positions and the monocular image detection edges, the locus is erroneously derived in some cases as shown in the drawing in which t=5 is given. In such a situation, it is also difficult to highly accurately predict the future locus of the target.

Figure 6:
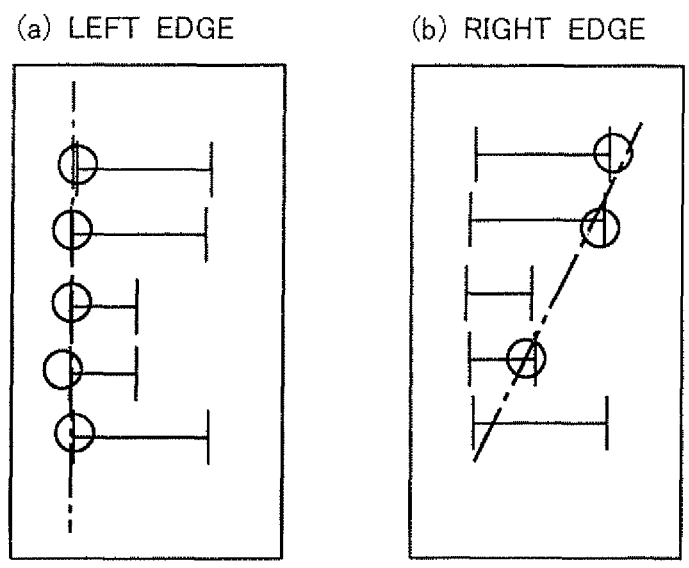
FIG. 6 shows locus approximation lines of right edges and left edges derived for monocular image detection edges according to the first embodiment.
Figure 7:
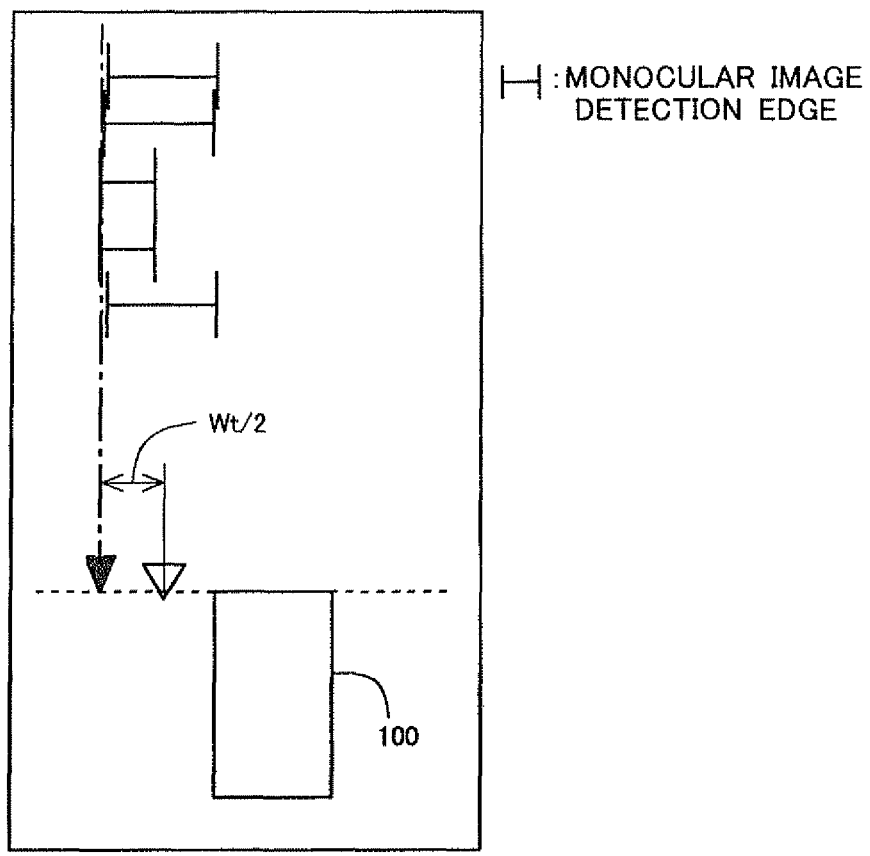
FIG. 7 shows the relationship among the locus approximation line of the selected edge, the predicted future locus, the collision position, and the lateral position of the target center according to the first embodiment.

If the collision is judged between the subject vehicle 100 and the target in the collision judging section 7 on the basis of the erroneously predicted locus of the target, it is feared that any erroneous judgment may be caused. Accordingly, in this embodiment, the following lateral position deriving process is performed for the image picked up by the monocular image sensor 2 in order to derive the lateral position of the target to be used for the collision judgment in the collision judging section 7. FIGS. 6 and 7 show images of the lateral position deriving process according to this embodiment.

In the lateral position deriving process according to this embodiment, as shown in FIG. 6, locus approximation lines, which are straight lines or predetermined curved lines for approximating the loci of the right edge and the left edge respectively, are derived for the plurality of monocular image detection edges detected by the edge detecting section 61 every time when a predetermined period of time elapses (every time when 50 ms elapses in this embodiment), in the locus approximation line deriving section 62 of the object detecting section 6. Any one of FIGS. 6(*a*) and 6(*b*) shows the monocular image detection edges detected in FIG. 5. An alternate long and short dash line shown in FIG. 6(*a*) indicates the locus approximation line derived for the left edges. An alternate long and short dash line shown in FIG. 6(*b*) indicates the locus approximation line derived for the right edges. A method for deriving the locus approximation line is previously determined. In this case, it is allowable to use any known method including, for example, the least square method and the spline interpolation method. The "predetermined curve" means the curve derived in accordance with the previously determined approximation method.

As shown in FIG. 6(*a*), it is noted that all of the left edges are normally detected. Therefore, all of the five edges exist on the locus approximation line. On the other hand, as shown in FIG. 6(*b*), the edges, which are erroneously detected, are included in the right edges. Therefore, only the three of the five edges exist on the locus approximation line. In this procedure, the edge, which exists within a predetermined allowable range from the locus approximation line, is counted assuming that the edge exists on the locus approximation line, even when the edge is not disposed at the position completely coincident with the locus approximation line. In FIGS. 6(*a*) and 6(*b*), the edges surrounded by circles indicate the "edges existing on the locus approximation line".

In other words, it can be judged that the edge, which has the larger number of edges existing on the locus approximation line, has the higher reliability as compared with the edge which has the smaller number of edges existing on the locus approximation line. Accordingly, the reliabilities of the right edge and the left edge are calculated on the basis of the numbers of edges existing on the locus approximation lines in the selecting section 63. The edge, which is selected from the right edge and the left edge and which has the higher reliability (i.e., the edge having the larger number of edges existing on the locus approximation line (left edge in FIG. 6)), is selected as the true edge of the target.

In the lateral position deriving section 64, the lateral position of the target is derived on the basis of the position of the edge (hereinafter referred to as "selected edge" in some cases) selected as the true edge of the target in the selecting section 63. More specifically, as shown in FIG. 7, the future locus of the selected edge (left edge in FIG. 7) is firstly predicted on the basis of the past locus approximation line in the locus predicting section 641. In FIG. 7, the arrow, which is indicated by an alternate long and short dash line, represents the past locus approximation line and the predicted future locus of the selected edge.

Subsequently, in the collision position predicting section 642, the collision position between the target and the subject vehicle 100 is predicted as the position at which the distance in the front-back direction between the selected edge and the subject vehicle 100 is zero, on the basis of the future locus of the selected edge predicted in the locus predicting section 641 and the orbit of the subject vehicle 100 calculated in the subject vehicle orbit calculating section of ECU 10. In FIG. 7, a broken line indicates the collision position.

Further, in the lateral position deriving section 64, the lateral width Wt of the target is estimated in the lateral width estimating section 643. In this case, any known method is usable as the lateral width estimating method. Specifically, it is possible to exemplify, for example, a method in which the average value of lateral widths of the target derived from the monocular image detection edges is calculated as the lateral width Wt of the target, and a method in which the lateral width Wt of the target is derived on the basis of the type of the target estimated from the intensity of the received wave in the millimeter wave radar 1.

In the target center lateral position deriving section 644, the lateral position of the target center, which is provided at the collision position predicted in the collision position predicting section 642, is derived. Specifically, the position, which is deviated toward the other edge (right edge in FIG. 7) by ½ of the lateral width Wt of the target estimated in the lateral width estimating section 643 from the position of the selected edge at the collision position, is derived as the lateral position of the target center at the collision position. In FIG. 7, the position, which is indicated by the blanked triangle, represents the lateral position of the target center at the collision position.

According to the lateral position deriving method as described above, the edge, which is included in the right edge and the left edge of the monocular image detection edges and which has the higher reliability, is selected as the true edge of the target. Further, the lateral position of the target center is derived at the collision position on the basis of the position of the edge having the higher reliability. Therefore, even when the monocular image sensor is used as the image sensor, it is possible to highly accurately derive the lateral position of the target center at the collision position.

In the collision judging section 7, the collision judgment is executed on the basis of the lateral position of the target center at the collision position derived in the object detecting section 6. Accordingly, it is possible to more highly accurately judge whether or not the subject vehicle 100 and the obstacle collide with each other.

(Collision Judgment Flow)

An explanation will be made on the basis of a flow chart shown in FIGS. 8 and 9 about a flow of the collision judgment for the subject vehicle and the obstacle according to this embodiment. This flow is repeatedly executed at predetermined intervals by ECU 10.

In this flow, firstly, in Step S101, the target, which exists at the millimeter wave detection position, is extracted from the image picked up by the monocular image sensor 2.

Subsequently, in Step S102, the right edge and the left edge are detected from the image of the target extracted in Step S101. The processes in Steps S101 and S102 are executed by the edge detecting section 61.

Subsequently, in Step S103, the locus approximation lines are derived for the right edge and the left edge respectively in relation to the plurality of monocular image detection edges detected in Step S102. The process in Step S103 is executed by the locus approximation line deriving section 62.

Subsequently, in Step S104, the reliabilities of the right edge and the left edge are calculated on the basis of the numbers of the edges existing on the locus approximation lines derived in Step S103.

Subsequently, in Step S105, the edge, which is either the right edge or the left edge and which has the higher reliability calculated in Step S104, is selected as the true edge of the target. The processes in Steps S104 and S105 are executed by the selecting section 63.

Subsequently, in Step S106, the future locus of the selected edge selected in Step S105 is predicted. The process in Step S106 is executed by the locus predicting section 641.

Subsequently, in Step S107, the collision position between the target and the subject vehicle 100 is predicted on the basis of the future locus of the selected edge predicted in Step S106 and the orbit of the subject vehicle 100 calculated in the subject vehicle orbit calculating section. The process in Step S107 is executed by the collision position predicting section 642.

Subsequently, in Step S108, the lateral width Wt of the target is estimated. The process in Step S108 is executed by the lateral width estimating section 643.

Subsequently, in Step S109, the position, which is deviated toward the other edge by ½ of the lateral width Wt of the target estimated in Step S108, is derived as the lateral position of the target center at the collision position from the position of the selected edge at the collision position predicted in Step S107. The process in Step S109 is executed by the target center lateral position deriving section 644.

Subsequently, in Step S110, the collision probability Pc between the target and the subject vehicle 100 is calculated on the basis of the lateral position of the target center at the collision position derived in Step S109.

Subsequently, in Step S111, it is judged whether or not the collision probability Pc, which is calculated in Step S110, is not less than the reference probability Pcbase. In this case, the reference probability Pcbase is the value preset as the threshold value at which it is to be judged that the target and the subject vehicle 100 collide with each other.

If the affirmative judgment is made in Step S111, it is subsequently judged in Step S112 that the target and the subject vehicle 100 collide with each other. On the other hand, if the negative judgment is made in Step S111, it is subsequently judged in Step S113 that the target and the subject vehicle 100 do not collide with each other. The processes in Steps S110 to S113 are executed by the collision judging section 7. If it is judged in Step S112 that the target and the subject vehicle 100 collide with each other, the collision judging section 7 transmits the ON signal to the warning apparatus 8 and the collision preventing/collision damage reducing system 9.

(Relationship Between Constitutive Elements of this Embodiment and Constitutive Requirements of the Present Invention)

In this embodiment, the object detecting section 6 corresponds to the object detecting apparatus according to the present invention. The relationship between the constitutive elements of the object detecting section 6 according to this embodiment and the constitutive requirements of the present invention is as follows. The edge detecting section 61 corresponds to the edge acquiring means according to the present invention. The locus approximation line deriving section 62 corresponds to the locus approximation line deriving means according to the present invention. The selecting section 63 corresponds to the selecting means according to the present invention. The lateral position deriving section 64 corresponds to the lateral position deriving means according to the present invention. The locus predicting section 641 corresponds to the locus predicting means according to the present invention. The collision position predicting section 642 corresponds to the collision position predicting means according to the present invention. The lateral width estimating section 643 corresponds to the lateral width estimating means according to the present invention.

Figure 8:
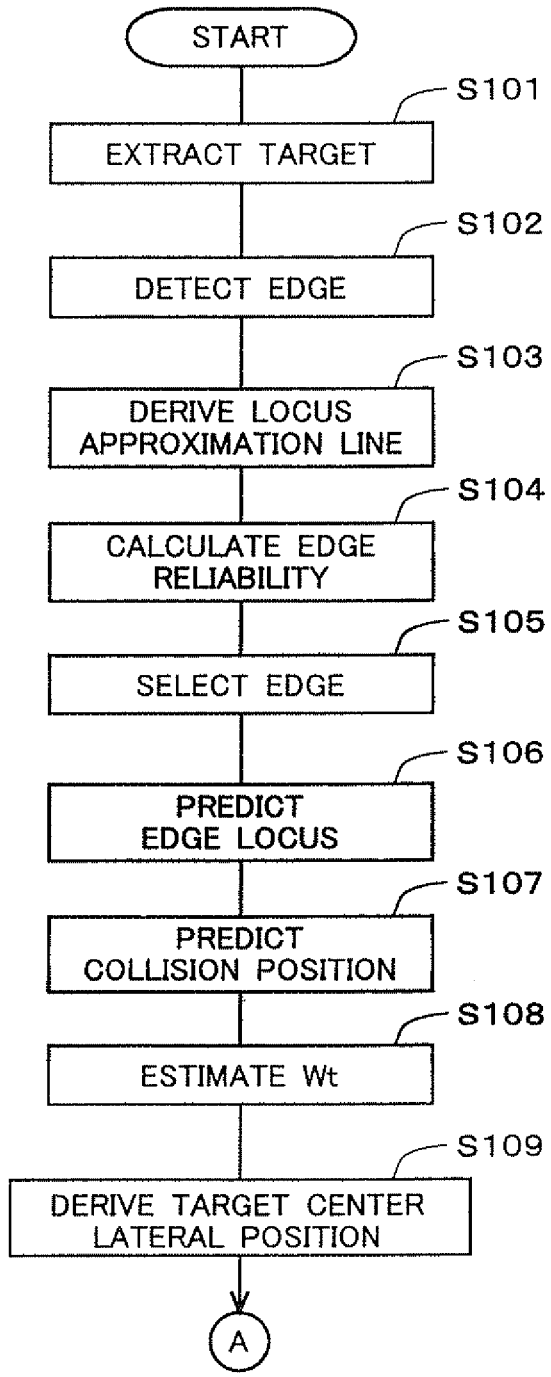
FIG. 8 shows a flow chart illustrating a part of a collision judgment flow according to the first embodiment.
Figure 9:
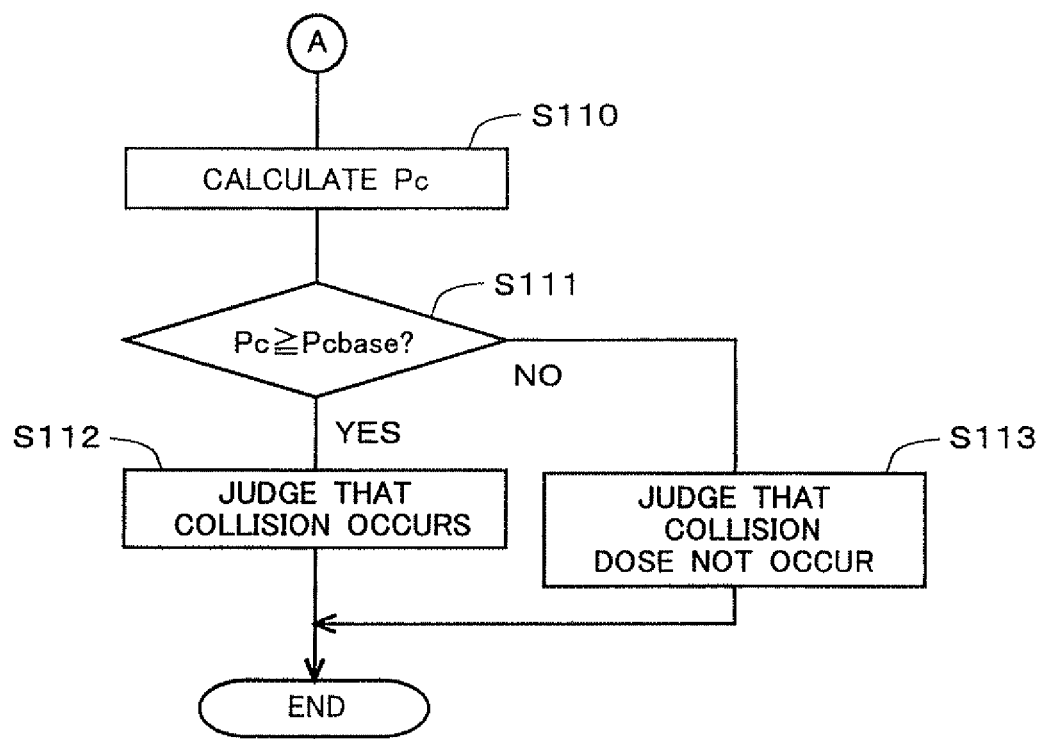
FIG. 9 shows a flow chart illustrating a part of the collision judgment flow according to the first embodiment.

In this embodiment, Steps S101 and S102 in the flow chart shown in FIG. 8 correspond to the edge acquiring step according to the present invention. Step S103 in the flow chart shown in FIG. 8 corresponds to the locus approximation line deriving step according to the present invention. Steps S104 and S105 in the flow chart shown in FIG. 8 correspond to the selecting step according to the present invention. Steps S106 to S109 in the flow chart shown in FIG. 8 correspond to the lateral position deriving step according to the present invention.

<Second Embodiment>

A first embodiment of the present invention will be explained on the basis of FIGS. 10 to 14. In this section, an explanation will be made about only the points or features different from those of the first embodiment.

(Schematic Arrangement)

Figure 10:
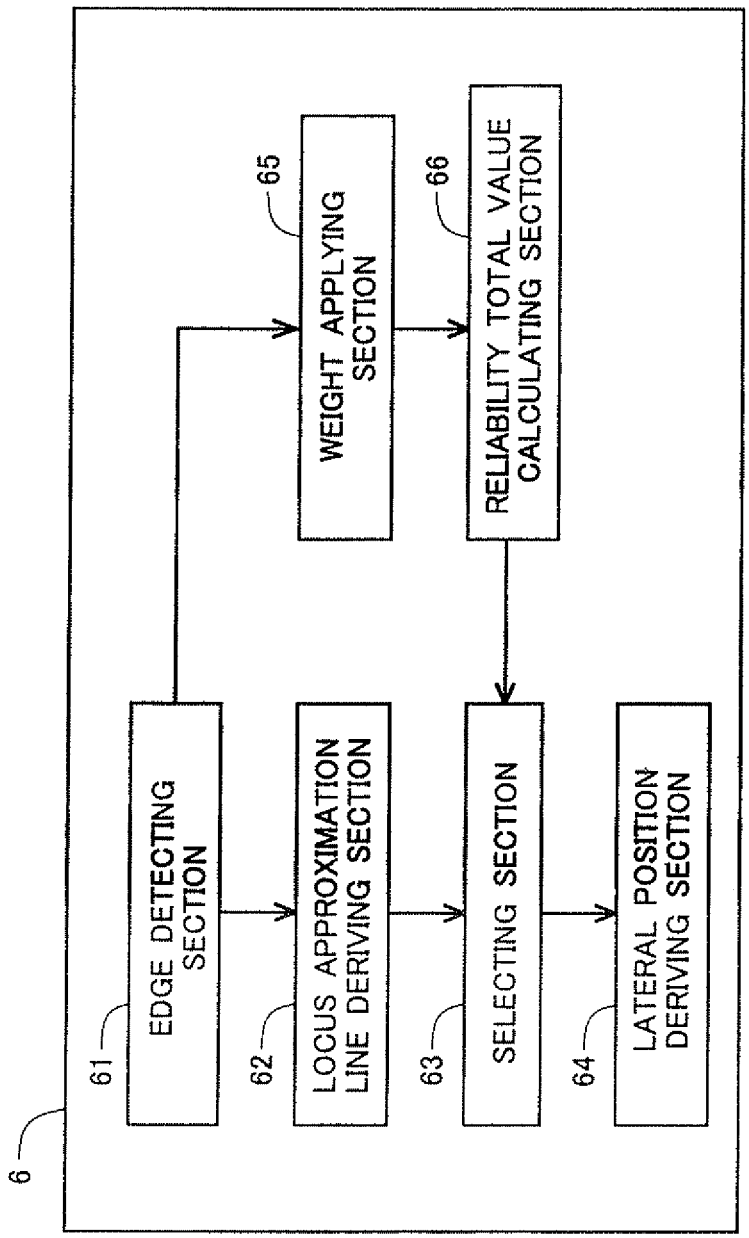
FIG. 10 shows a block diagram illustrating a schematic arrangement of an object detecting section according to a second embodiment.

FIG. 10 shows a block diagram illustrating a schematic arrangement of an object detecting section 6 according to this embodiment. As shown in FIG. 10, the object detecting section 6 according to this embodiment includes a weight applying section 65 and a reliability total value calculating section 66 in addition to the edge detecting section 61, the locus approximation line deriving section 62, the selecting section 63, and the lateral position deriving section 64. Details of the weight applying section 65 and the reliability total value calculating section 66 will be described later on.

(Method for Deriving Lateral Position)

Figure 11:
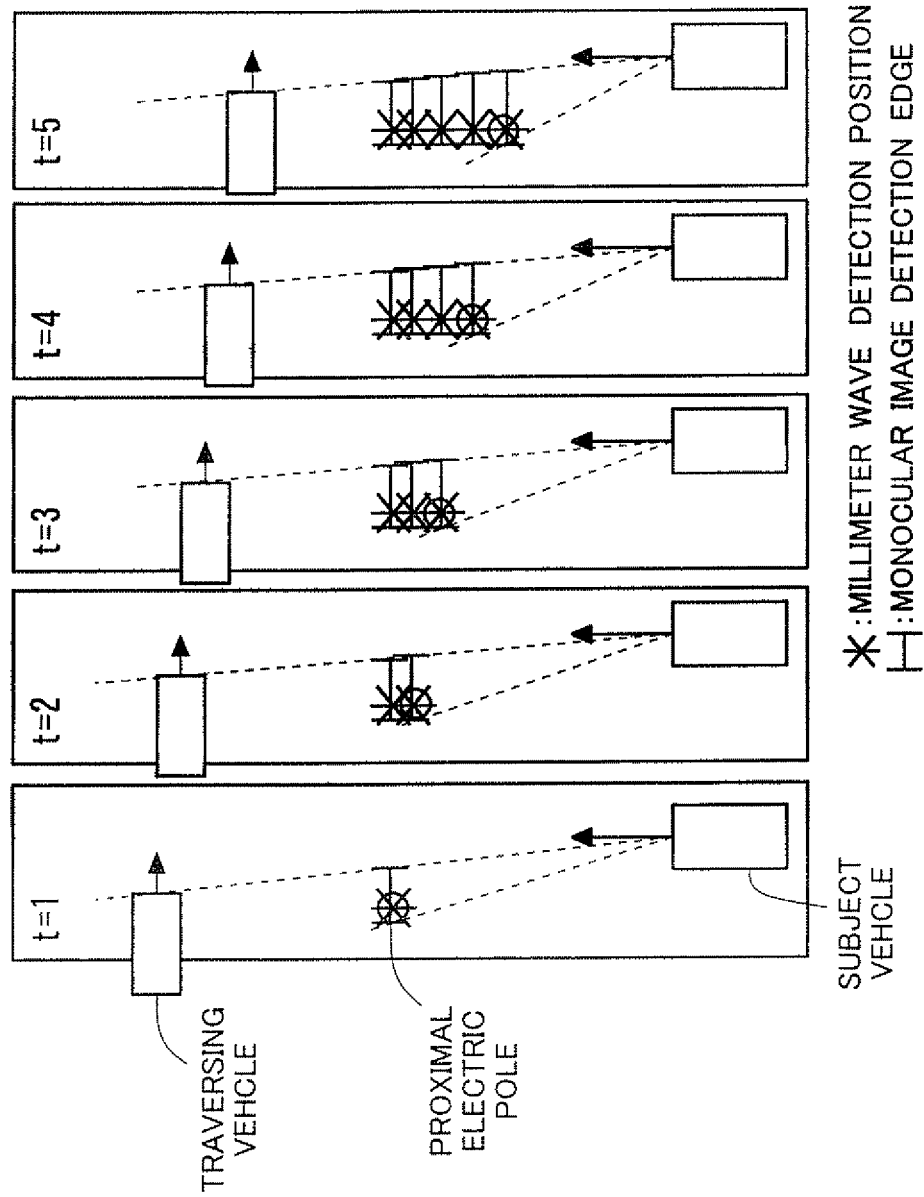
FIG. 11 shows a detection result obtained when an obstacle is detected by using a millimeter wave radar and a monocular image sensor.

A method for deriving the lateral position of an obstacle according to this embodiment will be explained on the basis of FIGS. 11 to 13. FIG. 11 shows a detection result obtained when the obstacle is detected by using a millimeter wave radar and a monocular image sensor according to this embodiment. FIG. 11 shows the time-dependent position change of the millimeter wave detection position and the monocular image detection edge with respect to the subject vehicle when a "proximal electric pole" is the target in the same manner as in FIG. 5. In FIG. 11, the drawing, in which t=n+1 is given, depicts the situation obtained 50 ms after the situation depicted in the drawing in which t=n is given in the same manner as in FIG. 5.

In the case of FIG. 11, a "traversing vehicle" exists distally as compared with the "proximal electric pole". In this situation, if the edge is detected from an image picked up or photographed by the monocular image sensor, the edge of the "traversing vehicle" is erroneously detected as the edge of the "proximal electric pole" in some cases. In FIG. 11, the right edge is erroneously detected every time. The erroneous detection as described above may be also caused when a fixed object such as the "distal electric pole" exists distally as compared with the "proximal electric pole" as the target, as caused in the case shown in FIG. 5. However, the erroneous detection tends to be caused more often when the object, which exists distally as compared with the target, is a moving object such as the "traversing vehicle" which moves in the transverse direction or the lateral direction.

In this embodiment, the following lateral position deriving process is performed for the image picked up by the monocular image sensor 2 in the object detecting section 6 in order to derive the lateral position of the target to be used for the collision judgment in the collision judging section 7. FIGS. 12 and 13 show images of the lateral position deriving process according to this embodiment.

Figure 12:
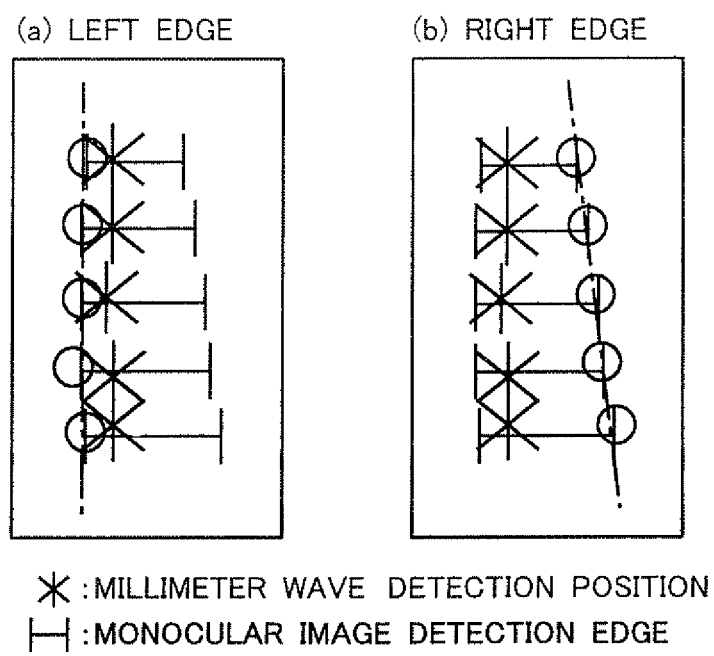
FIG. 12 shows locus approximation lines of right edges and left edges derived for monocular image detection edges according to the second embodiment.
Figure 13:
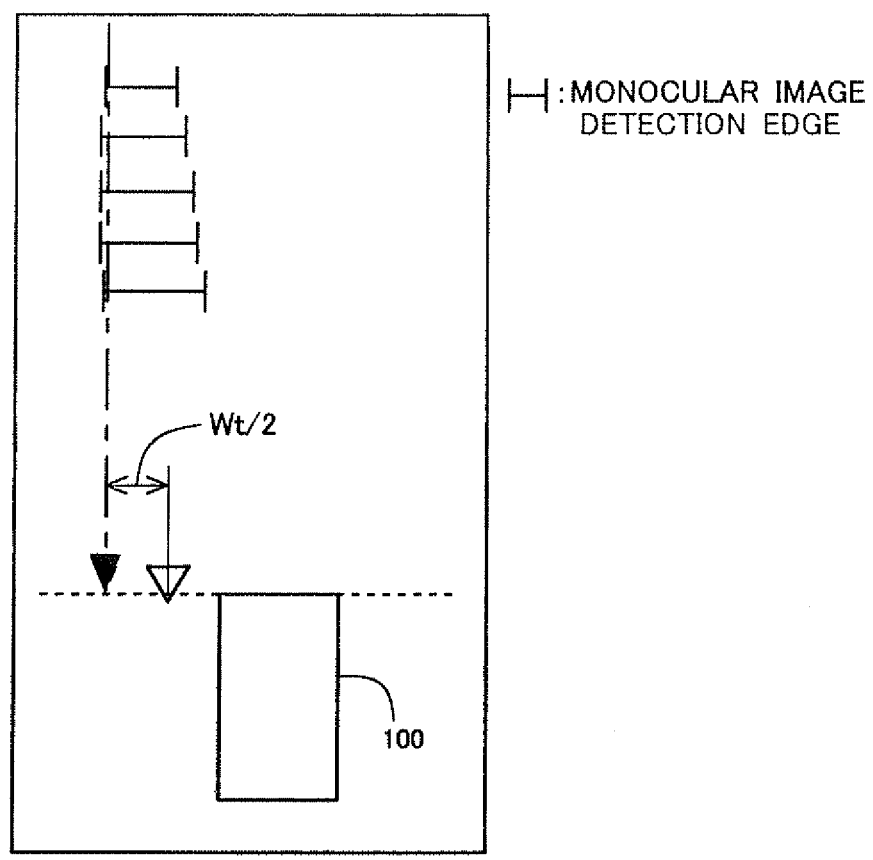
FIG. 13 shows the relationship among the locus approximation line of the selected edge, the predicted future locus, the collision position, and the lateral position of the target center according to the second embodiment.

Also in the lateral position deriving process according to this embodiment, as shown in FIG. 12, locus approximation lines, which are straight lines or predetermined curved lines for approximating the loci of the right edge and the left edge respectively, are derived for the plurality of monocular image detection edges detected by the edge detecting section 61 every time when a predetermined period of time elapses (every time when 50 ms elapses in this embodiment), in the locus approximation line deriving section 62 of the object detecting section 6. Any one of FIGS. 12(a) and 12(b) shows the millimeter wave detection positions and the monocular image detection edges detected in FIG. 11. An alternate long and short dash line shown in FIG. 12(a) indicates the locus approximation line derived for the left edges. An alternate long and short dash line shown in FIG. 12(b) indicates the locus approximation line derived for the right edges. A method for deriving the locus approximation line is the same as or equivalent to that in the first embodiment.

If the right edge is erroneously detected every time, as shown in FIG. 12(b), all of the five edges exist on the locus approximation line even in the case of the erroneous detection, in the same manner as the left edge normally detected as shown in FIG. 12(a). Also in this embodiment, the edge, which exists within a predetermined allowable range from the locus approximation line even when the edge is not disposed at the position completely coincident with the locus approximation line, is counted assuming that the edge exists on the locus approximation line in the same manner as the case of the first embodiment. In FIGS. 12(a) and 12(b), the edges, which are surrounded by circles, indicate the "edges existing on the locus approximation line".

Therefore, when the reliability of the edge is calculated on the basis of the number of edges existing on the locus approximation line, the reliability of the edge detected normally every time and the reliability of the edge detected erroneously every time are equivalent to one another. In such a situation, it is difficult to select the true edge of the target by means of the lateral position deriving process according to the first embodiment.

In view of the above, in the lateral position deriving process according to this embodiment, the weight is applied to the reliability in the weight applying section 65 on the basis of the distance from the millimeter wave detection position for each of the right edges and the left edges detected by the edge detecting section 61. In this procedure, the edge, which is disposed far from the millimeter wave detection position, has such a high possibility that the edge may be erroneously detected as compared with the edge which is disposed near to the millimeter wave detection position. Therefore, the weight applying section 65 applies the weight to the right edge and the left edge so that the edge, which is disposed nearer to the millimeter wave detection position, has the higher reliability.

Further, the reliability total value calculating section 66 calculates the total values of the reliabilities in relation to the both edges such that the plurality of reliabilities, to which the weights are applied by the weight applying section 65, are totalized for the right edges and the left edges respectively.

For example, in the case of the situation shown in FIG. 12, the left edges are disposed nearer to the millimeter wave detection position as compared with the right edges in relation to all of the five. In this procedure, it is assumed that the weight, which is applied to those disposed nearer to the millimeter wave detection position, is 1.1 points and the weight, which is applied to those disposed farther from the millimeter wave detection position, is 0.9 point in relation to the right edges and the left edges. On this assumption, the total value of the reliabilities of the left edges is 5.5 points, and the total value of the reliabilities of the right edges is 4.5 points.

In the selecting section 63, the edge (left edge in FIG. 12), which is included in the right edge and the left edge and which has the larger total value of the reliabilities calculated in the reliability total value calculating section 66, is selected as the true edge of the target. Accordingly, even if one edge is erroneously detected every time as shown in FIG. 11, the edge, which has the higher reliability, can be selected as the true edge of the target from the right edge and the left edge in relation to the monocular image detection edges.

In this embodiment, the lateral position of the target is derived in accordance with the same or equivalent method as that of the first embodiment on the basis of the position of the selected edge selected as described above in the lateral position deriving section 64. That is, as shown in FIG. 13, the future locus of the selected edge is predicted in the locus predicting section 641. Subsequently, the collision position between the target and the subject vehicle 100 is predicted in the collision position predicting section 642. Further, the lateral width Wt of the target is estimated in the lateral width estimating section 643. The lateral position of the target center at the collision position is derived in the target center lateral position deriving section 644. In FIG. 13, the arrow, which is indicated by an alternate long and short dash line, represents the past locus approximation line and the predicted future locus of the selected edge, a broken line represents the collision position, and the position indicated by a blanked triangle represents the lateral position of the target center at the collision position in the same manner as in FIG. 7.

The lateral position of the target center at the collision position is also derived on the basis of the position of the edge which has the higher reliability and which is selected from the right edge and the left edge of the monocular image detection edges in the same manner as in the first embodiment by means of the lateral position deriving method as described above. Therefore, even when the monocular image sensor is used as the image sensor, it is possible to highly accurately derive the lateral position of the target center at the collision position.

(Collision Judgment Flow)

An explanation will be made on the basis of a flow chart shown in FIG. 14 about a flow of the collision judgment for the subject vehicle and the obstacle according to this embodiment. This flow is repeatedly executed at predetermined intervals by ECU 10. In this flow, Steps S201 to S203 are added to the flow chart shown in FIG. 8. Therefore, only Steps S201 to S203 will be explained, and the other steps are omitted from the explanation.

In this flow, the process of Step S201 is executed next to Step S104. In Step S201, it is judged whether or not the reliability of the right edge and the reliability of the left edge, which are calculated in Step S104, are equivalent to one another. In this procedure, if the number of edges existing on the locus approximation line is identical between the right edge and the left edge, it is judged that the reliabilities of the both edges are equivalent to one another. If the negative judgment is made in Step S201, the process of Step S105 is subsequently executed. In this procedure, the processes to be executed thereafter are the same as those in the first embodiment. On the other hand, if the affirmative judgment is made in Step S201, the process of Step S202 is subsequently executed.

In Step S202, the reliability weight application is executed with respect to the right edge and the left edge in relation to the plurality of monocular image detection edges detected in Step S102. In this procedure, as described above, the weight is applied so that the edge, which is disposed nearer to the millimeter wave detection position, has the higher reliability. The process of Step S201 is executed by the weight applying section 65.

Subsequently, in Step S203, the plurality of reliabilities of right edges and left edges subjected to the weight application in Step S202 are totalized respectively to calculate the total values of the reliabilities in relation to the both edges. The process of Step S203 is executed by the reliability total value calculating section 66.

Subsequently, in Step S105, the true edge of the target is selected. In this procedure, in Step S105, the edge, which is included in the right edge and the left edge and which has the higher total value of the reliabilities calculated in Step S203, is selected as the true edge of the target. The processes to be performed thereafter are the same as or equivalent to those performed in the first embodiment.

(Relationship Between Constitutive Elements of this Embodiment and Constitutive Requirements of the Present Invention)

In this embodiment, the weight applying section 65 corresponds to the weight applying means according to the present invention, and the reliability total value calculating section 66 corresponds to the reliability total value calculating means according to the present invention.

Figure 14:
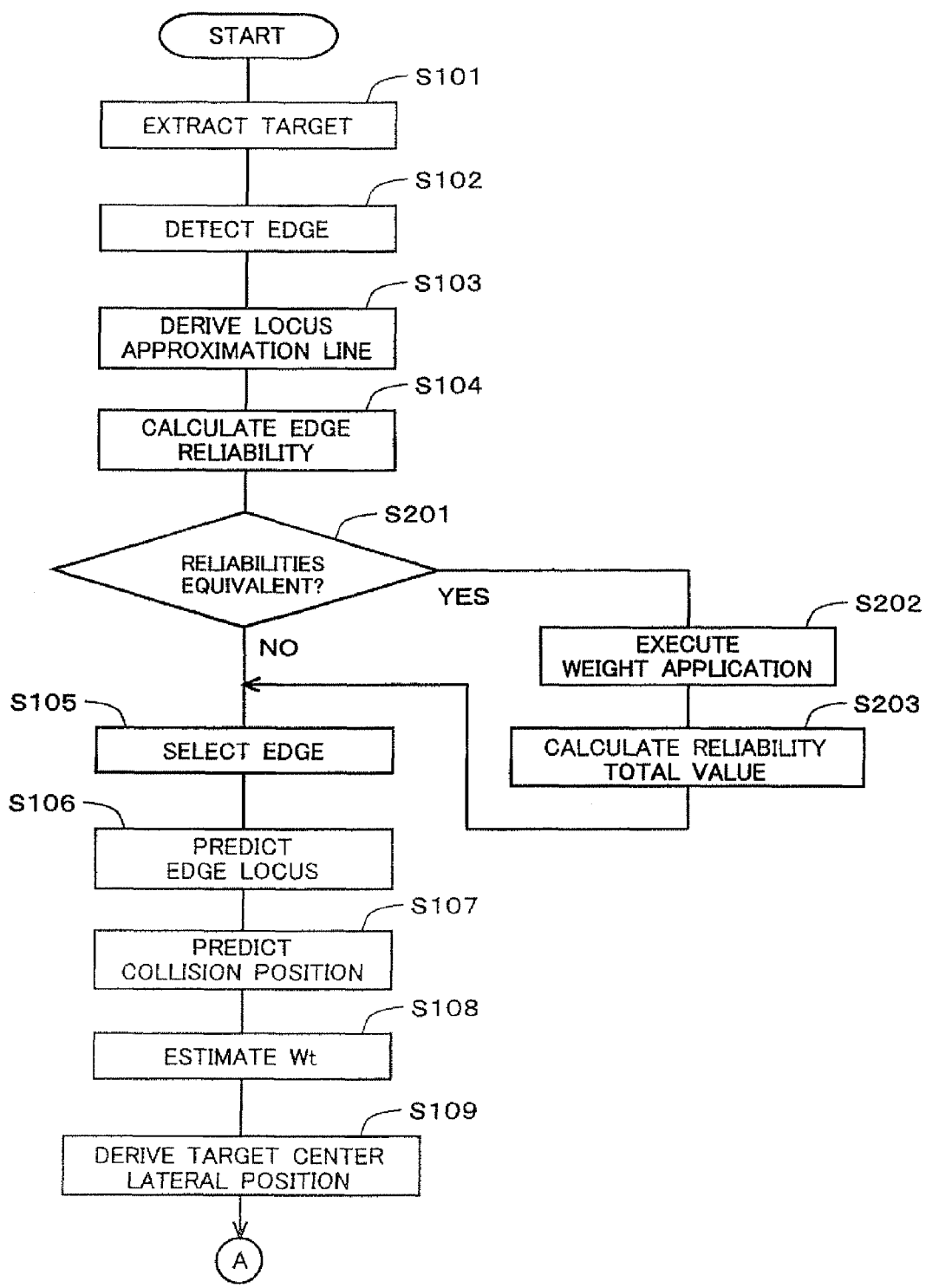
FIG. 14 shows a flow chart illustrating a part of a collision judgment flow according to the second embodiment.

In this embodiment, Step S202 in the flow chart shown in FIG. 14 corresponds to the weight applying step according to the present invention, and Step S203 in the flow chart corresponds to the reliability total value calculating step according to the present invention.

DESCRIPTION OF THE REFERENCE SIGNS

1: millimeter wave radar
2: monocular image sensor
3: steering angle sensor
4: yaw rate sensor
5: wheel pulse sensor
6: object detecting section
7: collision judging section
8: warning apparatus
9: collision preventing/collision damage reducing system
10: ECU
61: edge detecting section
62: locus approximation line deriving section
63: selecting section
64: lateral position deriving section
65: weight applying section
66: reliability total value calculating section
100: vehicle
200: collision predicting apparatus
641: locus predicting section
642: collision position predicting section
643: lateral width estimating section
644: target center lateral position deriving section.

The invention claimed is:

1. An object detecting apparatus for detecting an object on the basis of target information acquired by a radar and target information acquired from an image picked up by a monocular image sensor, the image being called a monocular image detection edge, the object detecting apparatus comprising:
    an edge acquiring unit configured to extract a target corresponding to a target recognized by the radar, from the image picked up by the monocular image sensor and to acquire
        a set of left edges by acquiring a left edge of the extracted target every time a predetermined period of time elapses; and
        a set of right edges by acquiring a right edge of the extracted target every time the predetermined period of time elapses; and
    a locus approximation line deriving unit configured to derive:
        for the set of left edges, a left edge locus approximation line as a straight line or predetermined curved line for approximating loci of the set of the left edges acquired by the edge acquiring unit every time the predetermined period of time elapses; and
        for the set of right edges, a right edge locus approximation line as a straight line or predetermined curved line for approximating loci of the set of the right edges acquired by the edge acquiring unit every time the predetermined period of time elapses; and
    a selecting unit configured to select a true edge of the target;
    a lateral position deriving unit configured to derive a lateral position of the target on the basis of a position of the true edge by the selecting unit;
    wherein:
        the true edge of the target is selected as either
            (1) a true left edge of the target in the event that a greater number of acquired left edges appear on the left edge locus approximation line than the number of acquired right edges that appear on the right edge locus approximation line; or
            (2) a true right edge of the target in the event that a greater number of acquired right edges appear on the right edge locus approximation line than the number of acquired left edges that appear on the left edge locus approximation line.

2. The object detecting apparatus according to claim 1, further comprising:
    a weight applying unit configured to apply reliability weights to the right edge and the left edge acquired by the edge acquiring unit so that the edge, which is disposed nearer to a position of the target recognized by the radar, has a higher reliability; and
    a reliability total value calculating unit configured to totalize a plurality of reliabilities having the weights applied by the weight applying unit for each of the right edge and the left edge to thereby calculate total values of the reliabilities for the both edges, wherein:
    the selecting unit selects, as the true edge of the target, the edge which has the larger total value of the reliabilities calculated by the reliability total value calculating unit, from the right edge and the left edge, if the number of the edges existing on the locus approximation line is identical between the right edge and the left edge acquired by the edge acquiring unit.

3. The object detecting apparatus according to claim 2, wherein the lateral position deriving unit includes:

a locus predicting unit configured to predict a future locus of the edge selected as the true edge by the selecting unit; and a collision position predicting unit configured to predict a collision position between the target and a vehicle as a position at which a distance between the edge and the vehicle in the front-back direction is zero on the basis of the future locus of the edge predicted by the locus predicting unit, wherein:

a lateral position of a center in a lateral direction of the target, which is to be provided at the collision position, is derived on the basis of a position at the collision position of the edge selected as the true edge by the selecting unit.

4. The object detecting apparatus according to claim 2, wherein:

the lateral position deriving unit includes a lateral width estimating unit configured to estimate a lateral width of the target; and a position, which is deviated toward the other edge by ½ of the lateral width of the target estimated by the lateral width estimating unit from the position of the edge selected as the true edge by the selecting unit, is derived as a lateral position of a center in a lateral direction of the target.

5. The object detecting apparatus according to claim 1, wherein the lateral position deriving unit includes:

a locus predicting unit configured to predict a future locus of the edge selected as the true edge by the selecting unit; and a collision position predicting unit configured to predict a collision position between the target and a vehicle as a position at which a distance between the edge and the vehicle in the front-back direction is zero on the basis of the future locus of the edge predicted by the locus predicting unit, wherein:

a lateral position of a center in a lateral direction of the target, which is to be provided at the collision position, is derived on the basis of a position at the collision position of the edge selected as the true edge by the selecting unit.

6. The object detecting apparatus according to claim 1, wherein:

the lateral position deriving unit includes a lateral width estimating unit configured to estimate a lateral width of the target; and a position, which is deviated toward the other edge by ½ of the lateral width of the target estimated by the lateral width estimating unit from the position of the edge selected as the true edge by the selecting unit, is derived as a lateral position of a center in a lateral direction of the target.

7. An object detecting method for detecting an object on the basis of target information acquired by a radar and target information acquired from an image picked up by a monocular image sensor, the image being called a monocular image detection edge, the object detecting method executed by an electronic control unit and comprising:

an edge acquiring step of extracting a target corresponding to a target recognized by the radar, from the image picked up by the monocular image sensor and acquiring:

a set of left edges by acquiring a left edge of the extracted target every time a predetermined period of time elapses; and a set of right edges by acquiring a right edge of the extracted target every time the predetermined period of time elapses; and a locus approximation line deriving step of deriving:

for the set of left edges, a left edge locus approximation line as a straight line or predetermined curved line for approximating loci of the set of the left edges acquired in the edge acquiring step every time a predetermined period of time elapses; and for the set of right edges, a right edge locus approximation line as a straight line or predetermined curved line for approximating loci of the set of the right edges acquired by the edge acquiring unit every time the predetermined period of time elapses; and a selecting step of selecting a true edge of the target; and a lateral position deriving step of deriving a lateral position of the target on the basis of a position of the true edge selected in the selecting step;

wherein:

the true edge of the target is selected as either:

(1) a true left edge of the target in the event that a greater number of acquired left edges appear on the left edge locus approximation line than the number of acquired right edges that appear on the right edge locus approximation line; or (2) a true right edge of the target in the event that a greater number of acquired right edges appear on the right edge locus approximation line than the number of acquired left edges that appear on the left edge locus approximation line.

8. The object detecting method according to claim 7, further comprising:

a weight applying step of applying reliability weights to the right edge and the left edge acquired in the edge acquiring step so that the edge, which is disposed nearer to a position of the target recognized by the radar, has a higher reliability; and a reliability total value calculating step of totalizing a plurality of reliabilities having the weights applied in the weight applying step for each of the right edge and the left edge to thereby calculate total values of the reliabilities for the both edges, wherein:

the edge, which has the larger total value of the reliabilities calculated in the reliability total value calculating step, is selected as the true edge of the target from the right edge and the left edge in the selecting step, if the number of the edges existing on the locus approximation line is identical between the right edge and the left edge acquired in the edge acquiring step.

* * * * *